United States Patent [19]

de Guillebon

[11] Patent Number: 4,966,571
[45] Date of Patent: Oct. 30, 1990

[54] INTERNAL COMBUSTION ENGINE

[75] Inventor: Hubert de Guillebon, Decize, France

[73] Assignee: Casutchouc Manufacture et Plastiques, Versailles, France

[21] Appl. No.: 417,522

[22] Filed: Oct. 5, 1989

[30] Foreign Application Priority Data

Oct. 5, 1988 [FR] France .................. 88 13147

[51] Int. Cl.⁵ .............................. F16H 7/08
[52] U.S. Cl. .................... 474/111; 474/112; 474/133; 474/135
[58] Field of Search ........ 474/101, 109–112, 474/113–117, 133, 135, 136, 138

[56] References Cited

U.S. PATENT DOCUMENTS

| 3,977,266 | 8/1976 | Tantlinger | 474/135 X |
| 4,046,022 | 9/1977 | Henderson | 474/133 X |
| 4,177,689 | 12/1979 | Zeilinger et al. | 474/111 X |
| 4,713,044 | 12/1987 | Nakamura et al. | 474/135 |
| 4,713,045 | 12/1987 | Kodama et al. | 474/135 |
| 4,822,321 | 4/1989 | Webb | 474/135 x |
| 4,904,230 | 2/1990 | Kawashima et al. | 474/112 |

FOREIGN PATENT DOCUMENTS

| 0188077 | 11/1985 | European Pat. Off. . |
| 0243237 | 4/1987 | European Pat. Off. . |
| 3528442 | 8/1985 | Fed. Rep. of Germany . |
| 2510217 | 7/1982 | France . |
| 2558496 | 1/1984 | France . |

Primary Examiner—Thuy M. Bui
Attorney, Agent, or Firm—Nils H. Ljungman & Associates

[57] ABSTRACT

Transmission tensioning pulley for flexible or articulated coupling, having a lever to compensate for thermal expansion and contraction, and regulated by a cam, characterized by the fact that under stable or transient conditions, the thermal expansions and contractions are compensated by the multiplier lever arm ratios and the length of the compensator bar.

26 Claims, 3 Drawing Sheets

FIG_1

FIG_3
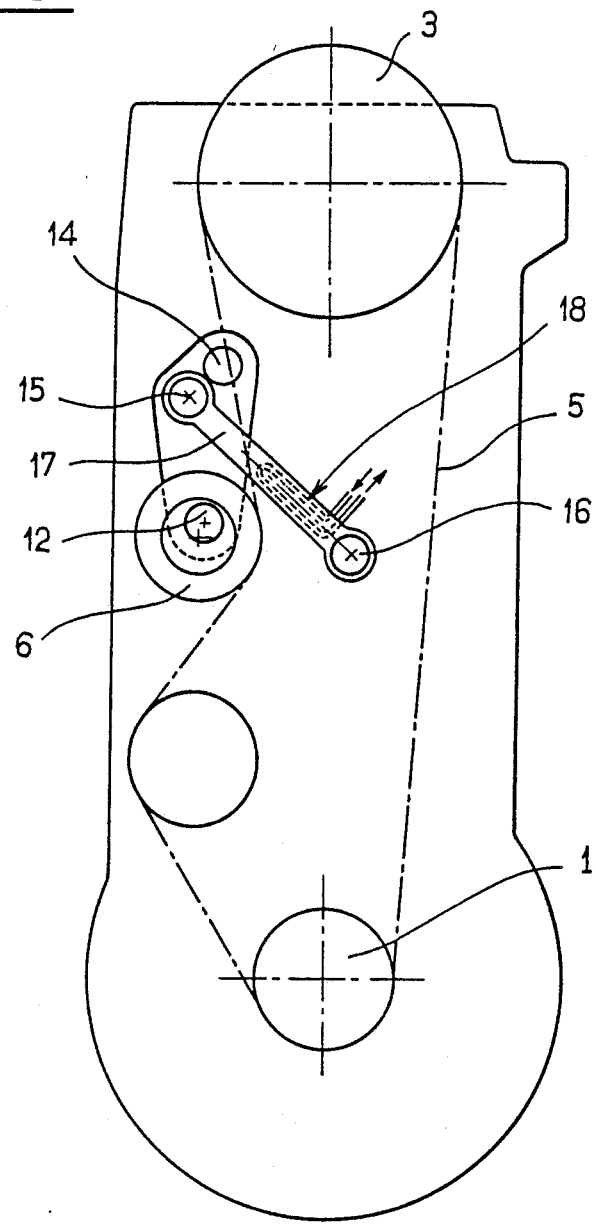

INTERNAL COMBUSTION ENGINE

BACKGROUND OF THE INVENTION

1. Field of the Invention:

This invention relates to internal flexible or articulated coupling transmissions and, more particularly, to combustion engines with toothed belt synchronous transmissions which transmit a rotational movement from one shaft to another parallel shaft. The shafts are of the type which require mandatory indexing, like those used for controlling overhead camshafts in an internal combustion engine. The installation of one or more overhead camshafts in the cylinder block of a modern internal combustion engine, typically, requires a transmission having two pulley wheels or gears with a ratio of one to one half between which a toothed belt is stretched. Such a transmission is, sometimes, provided in the form of a lubricated sprocket chain or, currently more often, by a synchronous toothed belt, with the wheels or gears connected thereto, in a sealed, dry housing. This technology, which requires indexing the movements of the pulleys, leads to the use of material of low elasticity, preferably glass fiber cable embedded in an elastomer compound, for the belt strap. The teeth of the synchronous belt, or rather a belt for synchronous operation, are molded in the elastomer compound.

2. Description of the Prior Art:

The internal temperature of the engine may range from $-35°$ C. at starting, to continuous temperatures which can stabilize at $110°$ C. during operation of the engine. That higher value may even be exceeded when the engine is shut down after intensive operation. For proper operation, such engine belts require a moderate belt tension. For example, for an ordinary 4 cylinder engine, a value of 18 deca Newtons ("daN") per belt side is required at current typical operating temperatures.

This tension is increased, in a manner which can be prejudicial to the service life of the belt, by the thermal expansion of the center-to-center distance and the diameter of the shaft supported wheels or gears on which the belts are positioned when the engine reaches a temperature of $110°$ C. An example of belt tension, actually measured on an engine, was 54 daN per side on a belt having an overall length of approximately one meter. In the same engine as an example, the tension of the belt is reduced to 3.5 daN at the lowest starting temperatures. This reduction in tension, along with the action of the starting torque increased by the viscosity of the oil, can in certain cases cause a dynamic jerk, or skip, which can damage certain parts of the engine.

The principle of synchronous belts with a fixed center-to-center distance allows the use of a tensioning roller pressing against one of the sides of the belt, most frequently on the smooth reverse side of the belt, to establish the tension during installation and during maintenance. A permanent elastic tension mounting of this device is generally difficult and expensive on an internal combustion engine. This is because the engine cycle is, by definition, pulsatory, and the cam follower shaft is also characterized by pulsatory resistance due to the lifting of the valves of the engine. The examination of mass-spring systems, typically, shows highly resonant engine operating conditions accompanied by shocks and high pulsatory fatigue stresses.

Elastic tensioning devices, with incorporated damping, are disclosed in German Patent No. 35 28 442 to Daimler-Benz, European Patent No. 02 43 237 to Hutchinson and European Patent No. 01 88 077 to Litens Automotive. However, the employment of such devices in an overhead camshaft remain difficult and expensive to implement. The manufacturers of such engines are, therefore, required to install belts having a fixed center-to-center distance or, more conventionally, having a tensioning roller which is locked in position after the adjustment has been made. Sometimes there are means to compensate for the variations in center-to-center distance under the action of temperature.

For top-loading and front-loading washing machines, a rather primitive device is described in French Patent No. 2,558,496 to Esswein S.A. The device appears to work by means of a set of differential expansion levers acting on the pulleys in a cantilever fashion. For a transmission which employs a toothed belt, greater demands are placed on the parallelism of the shafts. French Patent No. 2,510,217 to Piaggio discloses a so-called "regulator," which acts by means of an appropriate lever between the aluminum alloy cylinder block expansion and a compensator rod made of steel.

In this apparatus, the tension is initially established by a spring acting on a lever arm. A steel rod, positioned against a stop, limits the force exerted by the spring on the belt when the temperature of the engine block rises, as long as the temperature of the steel rod changes in relation to the engine block temperature.

However, there is no mention in French Patent No. 2,510,217, either of operation at very low temperatures, where the slack in the belt apparently is compensated by the spring alone, or of transient conditions, where the engine block reaches high temperatures much more rapidly than the compensation rod, which stabilizes only several minutes later. A large reduction in the tension of the belt during these transient conditions would likely cause a dynamic jerk, or skipping, of the synchronous belt.

OBJECT OF THE INVENTION

An object of this invention, therefore, is to eliminate the above-mentioned disadvantages of the devices of the prior art, particularly under transient conditions where the materials are subjected to different temperatures. The compensation for thermal expansion and contraction, which is theoretically exact, is possible if the two materials, or the weighted set of several materials, have significantly different coefficients of thermal expansion where, preferably, the lowest of the thermal expansion coefficients is near zero. Thus, one embodiment of the invention takes advantage of the particular properties of an iron-nickel alloy named "Invar." The thermal expansion coefficients of the various materials for the transmission device described above, in order of magnitude, are:

$23 \times 10^{-6}$ per degree C. for light alloys $11 \times 10^{-6}$ per degree C. for steels or cast iron $05 \times 10^{-6}$ per degree C. for glass fiber cables Therefore, there is a differential value of the thermal expansion coefficient of $18 \times 10^{-6}$ per degree C. for an aluminum engine block with aluminum pulleys which must be compensated by a differential value of the thermal expansion coefficient of $12 \times 10^{-6}$ per degree C. between aluminum and a steel rod, as described in French Patent No. 2,510,217.

SUMMARY OF THE INVENTION

With identical geometry, the re-establishment of the proper tension of the belt requires a displacement of a roller, which presses against the side of the belt, as a function of the variations of the belt perimeter; a perimeter which can be assumed to be one, in this first case cited in French Patent No. 2,510,217.

Preferably, a material having a coefficient of thermal expansion which is lower than that of steel is employed. For example, Invar, an iron-nickel alloy of limited expansion, may be employed. The most common varieties of Invar have an expansion coefficient of $1.2 \times 10^{-6}$ per degree C. and those with superior qualities, such as those that are work-hardened and heat-treated, have a thermal expansion coefficient of $0.5 \times 10^{-6}$ per degree C. For the abovementioned engine block, the differential value of the thermal expansion coefficients of $18 \times 10^{-6}$ per degree can be compensated by a differential thermal expansion of $21.8 \times 10^{-6}$ per degree C. between aluminum and an Invar rod which, under identical geometric conditions, makes it possible to divide the required length of the rod by a ratio 1.8, making possible sizes which are easier to fabricate and employ.

But, primarily in the case of an engine block made of ferrous materials, the differential thermal expansion becomes $6 \times 10^{-6}$ per degree C. over the center-to-center distance and is, therefore, easy to offset by differential thermal expansion of $9.8 \times 10^{-6}$ per degree C. between the center-to-center distance and an Invar rod, which divides the necessary length of the rod by 2.5, compared to the first example. In this latter case, compensation has not been necessary up to now, because the absolute value is three times less than in the case cited in French Patent No. 2,510,217. Nevertheless, in both cases, the temperature exhibited by an Invar rod compared to a steel rod has geometric effects which are 10 times less for the first and 20 times less for the second with regard to the differential thermal expansion. Its use makes possible a much higher geometric precision, even under transient conditions, thereby eliminating the decrease in belt tension and the related risks.

Under transient conditions, where the change in the temperature of the compensation rod is delayed, an embodiment of the invention acts as if the thermal expansion coefficient of the latter were zero and as if the apparent differential thermal expansion, instead of $21.8 \times 10^{-6}$ per degree C., had been increased to $23 \times 10^{-6}$ per degree C., for an aluminum engine block. Even for a block made of ferrous alloy, this coefficient increases from $9.8 \times 10^{-6}$ per degree to $11 \times 10^{-6}$ per degree.

The relative thermal variation remains low, but in any case allows ample compensation for the difference between the values cited in each of the cases by the selection of the lever arms, so that the requirements under transient conditions are better satisfied than in stabilized conditions. More expensive varieties of Invar, with even lower coefficients of thermal expansion, are not required since the embodiment of the invention makes possible a compensation which reduces the tension variations induced in the belt by a ratio of more than 10 for a steel or cast iron block and by a ratio of more than 20 for a light alloy block. This ratio is evaluated by comparison to current technology in which compensation for thermal variations is not applied.

Therefore, the invention consists in one embodiment, of a device to compensate for thermal expansion on a tensioning roller in a flexible or articulated coupling transmission. The invention is characterized by the fact that the lever which holds the roller is fixed in relation to the center-to-center distance between the pulleys at a stabilized temperature and supports a regulating cam tensioning roller bearing. The compensation for thermal expansion and contraction is effected by rotation of the lever around a fixed point. A third point of the lever arm is in contact with a compensator bar made of a material having a thermal expansion coefficient which is preferably at least 50% higher or lower than that of the materials maintaining the center-to-center distance between the pulleys. This material may be an iron-nickel alloy having a reduced thermal expansion coefficient which can be considered approximately zero compared to that of the materials maintaining the center-to-center distance between the pulleys.

In summation, one aspect of the invention resides broadly in an internal combustion engine comprising: mechanical power generation means having an operating system for generating mechanical power; first wheel means for being connected to and receiving mechanical power from said mechanical power generation means: second wheel means positioned at a spaced-apart distance from said first wheel means said second wheel means being connected to and for receiving at least a portion of said mechanical power from said operating system; belt means having a surface, said belt means being connected between said first wheel means and said second wheel means for transferring mechanical power from said first wheel means to said second wheel means; and belt tension adjusting means for being in contact with said surface of said belt means for adjusting the tension of said belt means by applying a controlled amount of force to said surface of said belt means; said belt tension adjusting means comprising: force application means for being in contact with said surface of said belt means for applying said controlled amount of force to said surface of said belt means, support means relatively movable toward and away from said surface of said belt means to adjust said controlled amount of force, and support moving means having a changeable length for being mechanically connected to said support means for moving said support means in directions toward and away from said surface of said belt means when said length of said support moving means changes; said support moving means having a preselected temperature expansion coefficient to change said length of said support moving means relative to at least one temperature of said engine, and said force application means, said support means and said support moving means each being relatively sized and each being relatively positioned with respect to said surface of said belt means; said preselected temperature expansion coefficient being selected for causing said controlled amount of force to be applied to said surface of said belt means relative to at least one temperature, whereby said belt tension adjusting means adjusts the tension of said belt means when a change in said at least one temperature causes said spaced-apart distance between said first wheel means and said second wheel means to change.

Another aspect of the invention resides broadly in a belt tension adjusting means for being in contact with a surface of a belt, said belt being suspended by first and second wheel means positioned a spaced-apart distance from one another, said belt tension adjusting means for adjusting the tension of said belt by applying a controlled amount of force to said surface of said belt, said belt tension adjusting means comprising: force application means for being in contact with said surface of said belt for applying said controlled amount of force to said surface of said belt; support means relatively movable in directions toward and away from said surface of said belt to adjust said controlled amount of force: and support moving means having a changeable length for being mechanically connected to said support means for moving said support means in directions toward and away from said surface of said belt when said length of said support moving means changes; said support moving means having a preselected temperature expansion coefficient to change said length of said support moving means relative to at least one temperature in the environs of said belt; and said force application means, said support means and said support moving means each being relatively sized and each being relatively positioned with respect to said surface of said belt; said preselected temperature expansion coefficient being selected for causing said controlled amount of force to be applied to said surface of said belt relative to said at least one temperature, whereby said belt tension adjusting means adjusts the tension of said belt when a change in said at least one temperature causes said spaced-apart distance between said first wheel and said second wheel to change.

BRIEF DESCRIPTION OF THE DRAWINGS

The invention and its variants are explained in greater detail in the Description of the Preferred Embodiments along with accompanying drawings in which:

FIG. 3 is a side elevational view of another embodiment of the present invention.

FIG. 4 is a detailed view of a portion of FIG. 2.

FIG. 5 is another detailed view of a portion of FIG. 2.

FIG. 6 is still another detailed view of a portion of FIG. 2.

DESCRIPTION OF THE PREFERRED EMBODIMENTS

Figure 1:
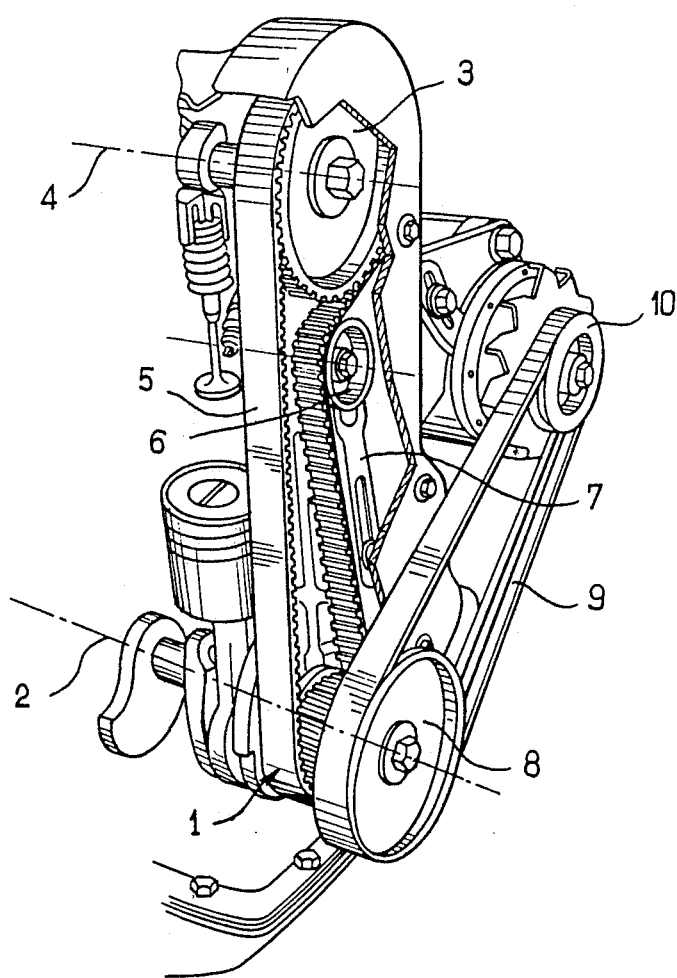
FIG. 1 is a perspective view of a portion of a toothed belt distribution transmission which employs the present invention.

FIG. 1 shows a transmission as it appears on the front side of an internal combustion engine when its protective housing is removed. A driving pulley 1, fastened to a crankshaft 2, drives at one-half speed, by action of a follower pulley 3, a camshaft mounted on a parallel shaft 4.

A toothed belt 5 which partially surrounds the pulleys is tensioned on the driving side preferably means of smooth roller 6, the axis of which is kept parallel to the shafts of the pulleys, and which smooth roller 6 is in contact with the smooth, reverse side of the synchronous belts which is equipped with teeth matching those of pulleys 1 and 3.

The bearing of the roller 6 is fixed rigidly, usually by control knobs, screws, bolts or other means, on the housing by means of a lever 7, shown schematically, which forms a part of the present invention. The movements of this kinetic system can often be pulsatory. Some accessories, such as the alternator and the water pump, are frequently driven by pulley 8 which is on the crankshaft. A belt 9, mechanically connects the pulleys 8 and 10 together. The diameter of the pulley 10 is smaller than the diameter of the pulley 8 and, consequently, a rotational inertia more sensitive to rotation pulsations is achieved.

Figure 2:
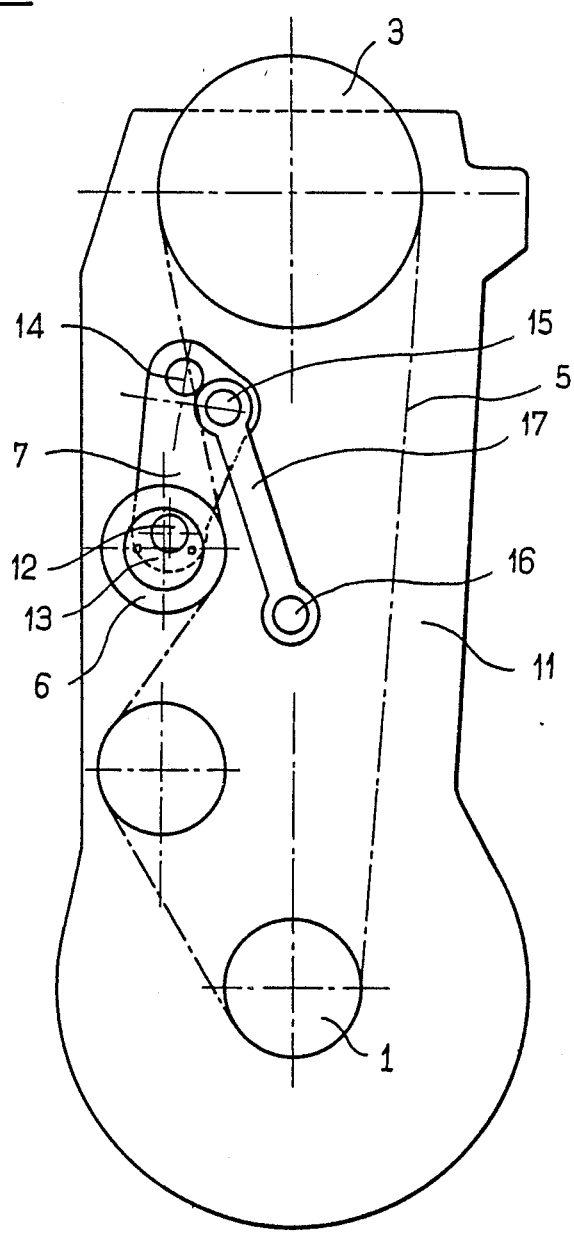
FIG. 2 is a side elevational view of the present invention.

FIG. 2 shows the synchronous transmission illustrated in FIG. 1 with some of the components inverted, such as the lever 7 and the roller 6. The pulleys 1 and 3 are connected by the belt 5. The belt 5 is pressed, on its smooth reverse side, by the roller 6 which is fastened by means of a ball bearing to the lever 7. The lever 7 is rigidly fastened to the housing on the front side of an engine block 11. On the smooth shaft 12, and held by a bolt and nut assembly, is an eccentric cam assembly 13, which supports the internal ring of a ball bearing or needle bearing on which the roller 6 revolves. Lugs, or holes made on the surface of the cam 13, make it possible to use simple tools during installation, to adjust and thus exert the necessary tension on belt 5 for rotation around the shaft 12. This tension can also be controlled by an appropriate tool, with much greater precision than the tensioning devices of the prior art, irrespective of the temperature of the engine block.

The lever 7, which is rigidly fixed to the engine block 11, is eliminated from any substantial possibility of receipt of elastic vibrations on account of the very high modulus of elasticity of the belt which is subjected to the controlled tension. The lever 7 has a pivot 14 which acts as a fixed point for the assembly and rotates about the pivot point, for example, on a smooth or rotating thread, or shaft, which is fastened to the front side of the engine block, such as on threaded dowels. Another analogous fixed point is provided by the shaft 16 which is fastened to one end of a compensator bar 17. The other end of the bar 17 rotates, in a manner similar to the shaft 14, on lever 17 by means of engagement to the shaft 15.

With this arrangement, the differential length variations of the distance between the shafts 15 and 16 are multiplied, for the displacement of the roller 6 perpendicular to the belt 5, by the ratio of the distances between the shafts 12 and 14 and the shafts 14 and 15 on the lever 7. The lever 7 must be sufficiently massive and in permanent compression contact, compensating for all the possible plays of the three typically smooth shafts, so that it vibrates no more than if it were permanently fastened to the engine block 11.

The result is that the above recited ratio of the center-to-center distances need not generally exceed 5 or 6 for the massive lever 7 of one decimeter in length. Such a length would be chosen, in the case of a transmission, using a belt having an overall length of approximately one meter.

Current combinations, such as an aluminum engine block with steel pulleys, will have similar orders of magnitude, where the apparent thermal expansion coefficient of the center-to-center distance will assume an intermediate value between $23 \times 10^{-6}$ per degree C. and $11 \times 10^{-6}$ per degree C., a value which can be calculated with precision on the basis of the precise geometry of the transmission, most commonly by means of a computer program.

After measuring the actual values, the ratio of the lever arms will be selected so that the above mentioned ratio precisely compensates for thermal expansion. The compensator bar 17 preferably will be manufactured industrially, at an acceptable cost, out of stamped Invar sheet metal. The selection of the ratio may be determined on the basis of the actual coefficient of thermal expansion of the compensator bar. A thermal expansion ratio approaching zero, provides constant tension under transient thermal conditions. A constant tension at stabilized temperatures may be achieved when the thermal expansion ratio is selected based on the actual coeeficient of thermal expansion of the compensator bar. FIG. 3 illustrates a variant of the present invention which employs a compensator bar with a higher thermal expansion coefficient than the material maintaining the center-to-center distance, such as made of ferrous metals.

For particular applications, a technician skilled in the art may prefer to compensate for the thermal expansion variations by a compensator bar 17 made, for example, of aluminum alloy, fastened in a similar fashion between the shaft 16 on the engine block and the shaft 15 rotating on the lever 7. The relative arrangements of the lever 7 and of the fixed point constituted by the shaft 14 must of course be reversed, but the calculation of the lever arms remains the same.

In this arrangement it is possible, to a certain extent, to expect a significant improvement under transient conditions if the compensator bar 17 is in intimate contact with coolant or, even better, with the engine lubricating oil. In the appropriate geometric arrangements, the compensator bar 17 could be an integral part, such as a support, of an oil cooling circuit 18 and, in that case, its thermal expansions could even anticipate those of the engine block, since the oil would heat the bar quicker, thereby ensuring compensation both under transient conditions and under stabilized thermal conditions.

Of course, a technician skilled in the art may employ any one, any combination, or all of the arrangements and variants without going beyond the context of the invention.

The present invention therefore has the advantage that it solves problems of noise and limited service life on overhead camshaft engines and their indexed transmissions, and eliminates or at least reduces the dynamic jerk or slipping under extreme thermal conditions, without modifications of the regular system, with belt tensions whose tolerance limits can be more easily assured. Consequently, it makes possible the use of more rigid belts which may have a higher tensile strength or with a thermal expansion coefficient very different from the average thermal expansion coefficients of the pulleys and of the engine block. FIGS. 4, 5, and 6 indicate dimensions and positions of the various components of FIG. 2. The information in FIGS. 4, 5, and 6 is incorporrated herein as if fully set forth.

In summation, one embodiment of the invention resides broadly in thermal expansion compensation device on a tensioning roller on a flexible or articulated coupling transmission, characterized by the fact that the lever 7 supporting the roller 6 is fixed in relation to the center-to-center distance of the pulleys 1 and 3 at a stabilized temperature, that it supports a bearing 12 with an eccentric cam 13, that the compensation of the thermal expansions takes place by rotation of the lever 7 around a fixed pivot 14, the third shaft 15 of the lever arm being in contact with a compensator bar 17 made of a material whose thermal expansion coefficient is at least 50% higher or lower than that of the materials maintaining the center-to-center distance of the pulleys.

Another embodiment of the invention resides in a thermal expansion compensation device characterized by the fact that the material of the compensator bar 17 is an iron-nickel alloy with a thermal expansion coefficient reduced by a ratio 1 per 10 to 1 per 20, which can be considered close to zero in relation to the materials constituting the engine, and that this compensator bar always works in compression under the action of the tension of the flexible coupling.

Still yet another embodiment of the invention resides in a thermal expansion compensation device characterized by the fact that the level arm ratios among the three shafts of the lever 7, as well as the length of the compensator bar 17, are calculated so that they precisely compensate for the expansions under stabilized thermal conditions.

A still further embodiment of the invention resides in a thermal expansion compensation device characterized by the fact that the lever arm ratios among the three shafts of the lever 7, as well as the length of the compensator rod 17, are calculated so that they partly compensate for the expansions under stabilized thermal conditions, the choice of said dimensions being limited by the overall dimensions of the system.

Another further embodiment of the invention resides in a thermal expansion compensation device characterized by the fact that the lever arm ratios among the three shafts of the lever 7, as well as the length of the compensator bar 17, are calculated to promote the compensation of expansions which occur under transient thermal conditions, where the expansion coefficient of said compensator bar 17 is negligible.

Another yet further embodiment of the invention resides in a thermal expansion compensation device characterized by the fact that the material of which the compensator bar 17 is made has a higher expansion coefficient than that of the materials maintaining the center-to-center distance between the pulleys, that it is placed in intimate contact with one of the engine coolants such as the lubrication oil, and that it works in permanent traction under the action of the tension of the flexible coupling.

All of the patents, patent applications, and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. An internal combustion engine comprising:
   mechanical power generation means having an operating system for generating mechanical power;
   first wheel means for being connected to and receiving mechanical power from said mechanical power generation means;
   second wheel means positioned at a spaced-apart distance from said first wheel means, said second wheel means being connected to and for receiving at least a portion of said mechanical power from said operating system;
   belt means having a surface, said belt means being connected between said first wheel means and said second wheel means for transferring mechanical power from said first wheel means to said second wheel means; and
   belt tension adjusting means for being in contact with said surface of said belt means for adjusting the tension of said belt means by applying a controlled amount of force to said surface of said belt means;

said belt tension adjusting means comprising:
force application means for being in contact with said surface of said belt means for applying said controlled amount of force to said surface of said belt means,
support means relatively movable in directions toward and away from said surface of said belt means to adjust said controlled amount of force, and
support moving means having a changeable length for being mechanically connected to said support means for moving said support means in directions toward and away from said surface of said belt means when said length of said support moving means changes;
said support moving means having a preselected temperature expansion coefficient to change said length of said support moving means relative to at least one temperature or a range of operating temperatures of said engine, and
said force application means, said support means and said support moving means each being relatively sized and each being relatively positioned with respect to said surface of said belt means; said preselected temperature expansion coefficient being selected for causing said controlled amount of force to be applied to said surface of said belt means relative to at least one temperature or a range of temperatures, whereby said belt tension adjusting means adjusts the tension of said belt means when a change in said temperatures causes said spaced-apart distance between said first wheel means and said second wheel means to change.

2. The apparatus of claim 1, wherein said force application means is roller means.

3. The apparatus of claim 2, wherein said support means is pivotally supported adjacent said belt.

4. The apparatus of claim 3, wherein said support moving means is pivotally connected to said support means.

5. The apparatus of claim 4, wherein said support moving means pivots said support means toward and away from said surface of said belt.

6. The apparatus of claim 5, wherein said roller means is eccentrically mounted on said support means.

7. The apparatus of claim 6, further including fluid means for being circulated in contact with said support moving means for adjusting the temperature of said support moving means.

8. The apparatus of claim 7, further including frame means for rotatably supporting said first an second wheel means.

9. The apparatus of claim 2, wherein the thermal expansion coefficient of said frame means and said thermal expansion coefficient of said support moving means are unequal.

10. The apparatus of claim 9, wherein said support moving means is constructed of an iron-nickel alloy.

11. Belt tension adjusting means for being in contact with a surface of a belt, said belt being suspended by first and second wheel means positioned a spaced-apart distance from one another, said belt tension adjusting means for adjusting the tension of said belt by applying controlled force to said surface of said belt, said belt tension adjusting means comprising;
force application means for being in contact with said surface of said belt of applying said controlled force to said surface of said belt;
support means relatively movable in directions toward and away from said surface of said belt to adjust said controlled force; and
support moving means having a changeable length for being mechanically connected to said support means for moving said support means in directions toward and away from said surface of said belt when said length of said support moving means changes;
said support moving means having a preselected temperature expansion coefficient to change said length of said support moving means relative to at least one temperature or range of temperatures in the environs of said belt; and
said force application means, said support means and said support moving means each being relatively sized and each being relatively positioned with respect to said surface of said belt; said preselected temperature expansion coefficient being selected for causing said controlled force to be applied to said surface of said belt relative to said at least one temperature or range of temperatures, whereby said belt tension adjusting means adjusts the tension of said belt when a change in said at least one temperature or said range of temperatures causes said spaced-apart distance between said first wheel and said second wheel to change. said belt when a change in said at least one temperature causes said spaced-apart distance between said first wheel and said second wheel to change.

12. The apparatus of claim 11, wherein said force application means is roller means.

13. The apparatus of claim 12, wherein said support means is pivotally supported adjacent said belt.

14. The apparatus of claim 13, wherein said support moving means is pivotally connected to said support means.

15. The apparatus of claim 14, wherein said support moving means pivots said support means toward and away from said surface of said belt.

16. The apparatus of claim 15, wherein said roller means is eccentrically mounted on said support means.

17. The apparatus of claim 16, further including frame means for rotatably supporting said first an second wheel means.

18. The apparatus of claim 17, wherein the thermal expansion coefficient of said frame means and said thermal expansion coefficient of said support moving means are unequal.

19. The apparatus of claim 18, wherein said preselected temperature expansion coefficient of said support moving means is at least 50% lower than the thermal expansion coefficient of said frame means.

20. The apparatus of claim 18, wherein said preselected temperature expansion coefficient of said support moving means is at least 50% higher than the thermal expansion coefficient of said frame means.

21. The apparatus of claim 18, wherein said belt tension adjusting means compensates for changes in the spaced-apart distance between said first wheel and said second wheel by changing said controlled amount of force applied to said belt.

22. The apparatus of claim 21, wherein said support means and said support moving means are relatively positioned to generally precisely compensate for a change in the spaced-apart distance between said first wheel and said second wheel under stabilized thermal conditions.

23. The apparatus of claim 21, wherein said support means and said support moving means are relatively positioned to only partly compensate for changes in said spaced-apart distance between said first wheel and said second wheel under stabilized thermal conditions.

24. The apparatus of claim 21, wherein said support means and said support moving means are relatively positioned to at least partly compensate for changes in said spaced-apart distance between said first wheel and said second wheel under transient thermal conditions.

25. The apparatus of claim 12, further including fluid means for being circulated in contact with said support moving means for adjusting the temperature of said support moving means.

26. The apparatus of claim 12, wherein said support moving means is constructed of an iron-nickel alloy.

* * * * *